United States Patent Office 3,022,197
Patented Feb. 20, 1962

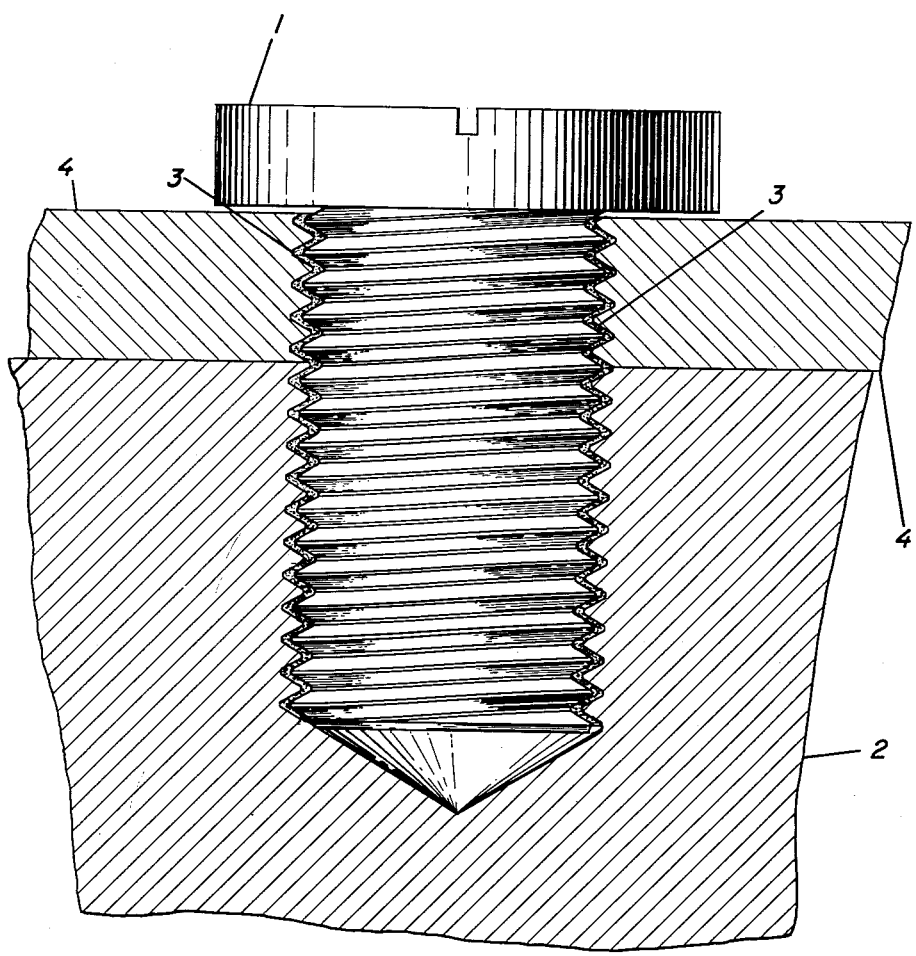

3,022,197
SECURING THREADED CONNECTIONS
Helmut Jedlicka, 56 Zollernstrasse, Schwenningen
(Neckar), Germany
Filed Feb. 19, 1958, Ser. No. 716,024
Claims priority, application Germany Feb. 21, 1957
2 Claims. (Cl. 117—132)

This invention generally relates to a method for securing threaded connections against the loosening effect of shocks, vibrations, etc. More particularly, this invention pertains to a method for securing screws, nuts, bolts and screw caps in corresponding threaded receptacles so that shocks, vibrations, etc., will not cause loosening of such connections. In a specific embodiment, this invention involves the placement of a high molecular dimethyl polysiloxane between threaded connections.

The problem

As is well known, there are numerous places where screws, bolts and other threaded elements are used to secure structural members together. In many places where screws, bolts and other threaded elements are used the cooperating threaded elements will gradually work loose from each other under the influence of vibrations, impacts, sudden shocks, etc. This progressive loosening of screws, bolts and other threaded elements is obviously highly undesirable since it necessitates periodic maintenance and causes unexpected breakdowns. In many instances it is nearly impossible to periodically inspect such threaded parts due to the fact that the threaded parts are located in an inaccessible area of a machine or are completely surrounded by other close fitting elements. As a consequence the fatal loosening of threaded parts is often not apparent until there is a failure in the structure or machine. This problem is particularly acute when the threaded parts are located in the vital parts of airplanes and other moving vehicles. Accordingly, it has long been realized that it would be highly desirable to provide some means for insuring against the loosening of threaded elements.

Prior art and its disadvantages

Attempts have already been made to secure screws and bolts in corresponding threaded structural parts by means of an adhesive substance. To this end organic cements or lacquer-like substances, such as thermoplastic or hardenable synthetic resins of various consistencies have been used. Their effect is generally due to the fact that, after application, they either harden or become excessively viscous and thereby establish a bond between the cooperating threaded parts. Their greatest disadvantage is that in the course of time their adhesive power changes, for instance due to aging, softening, or as a result of fatigue, and as a result of these changes, such media fail to fulfill their original purpose with sufficient reliability. This is especially true of screw joints which are dynamically stressed and in which the bonding agent is modified more or less, being detached, loosened, or destroyed, by shock, impact, or vibrations. Another disadvantage of such materials is that as their properties change, such a tight bond is formed that the threaded connections cannot be disconnected by the application of ordinary manual means.

Objects

It is therefore an object of this invention to provide a method for securing threaded connections against loosening effects of shocks, vibrations, etc.

A further object of this invention is to provide threaded connections which are secure against loosening effects by interposing between the threaded parts a material which will essentially retain its initial properties over long periods of time and which will perform in a uniform dependable manner over an extended period of time.

Another object of this invention is to provide a securing medium which is easy to handle, clean, non-corrosive and non-irritating.

The invention broadly

It has now been found that these objects can be achieved by interposing between the threaded members a highly viscous, non-reticulating, shock-elastic, and cold-flowing siloxane polymers, and more particularly high molecular weight dimethyl polysiloxanes which are free from filler materials and reticulation promoters.

In the attached drawing FIGURE 1 illustrates how the aforesaid siloxane polymers 3 are interposed between threaded members 1, 2 and 4. It will, for example, be appreciated that threaded member 1 could be a metallic screw, while members 2 and 4 could be two metallic plate portions which are internally threaded to receive the metallic screw.

The invention constitutes a considerable advance in the art of securing threaded connections.

The threaded parts

The threaded parts that are to be secured together in accordance with this invention may consist of any material, for instance of metal, glass, ceramic materials, or plastics. Even the adhesion of metal screws in wood and metal sheet is considerably improved by the invention. The threaded elements may be screws, bolts, threaded bolts, screw caps, threaded couplings, threaded pipes, etc. So far as is known, this invention is applicable to any sized threaded connection.

Placement of siloxane

In carrying out this invention, the threaded parts are secured by interposing a small quantity of the polysiloxane between the threads, the siloxane elastomer spreading between the threads when the parts are screwed together and subsequently as a result of the ability of the elastomer to flow when cold, the parts are adhesively bonded together.

Moreover, the high molecular weight dimethyl polysiloxane can be dissolved in a solvent, such as an aromatic or chlorinated aliphatic hydrocarbon, or used in the form of a dispersion, in order to facilitate the introduction of the elastomer between the threads of the screws or nuts. When the solvent or dispersant evaporates, it will leave the high molecular dimethyl polysiloxane in its original form.

The polysiloxane can be applied manually or with the aid of a mechanical dispensing device. Optimum results are usually obtained when the polysiloxane covers all of the threads, although good securing action is often achieved by covering only a portion of the threads. Since only a certain amount of polysiloxane can be accommodated between any two given threaded members without being squeezed out, the application of a considerable excess of polysiloxane does not do any real harm other than to waste material.

The polysiloxanes

The dimethyl polysiloxane polymers of this invention can be represented by the following skeletal structure:

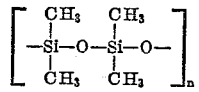

These highly polymerised dimethyl polysiloxanes which adhesively and shock-elastically retain the threaded parts are kneadable, highly viscous liquids (pastes) which retain their consistency and other properties for many years within a wide range of temperatures. As is well known, these dimethyl polysiloxanes are produced by the hydrolysis of highly purified dimethyl dichlorosilane and by polycondensation of the silicone oil thus obtained with the aid of acid or alkaline catalysts. Furthermore, according to this invention, the high molecular weight dimethyl polysiloxanes known as "bouncing rubber" or "bounding putty" may be employed, which are obtained, for instance, from liquid dimethylsiloxane polymers and small quantities of a boron compound such as boric acid by polymerisation.

The polysiloxanes are easy to handle, clean, non-corrosive and will not harm either the human skin or the bonded parts. The chemistry of polysiloxanes has been extensively described in patents and publications (see for example, Industrial and Engineering Chemistry, vol. 44, September 1952, p. 2196), or see U.S. Patent 2,541,851, Wright, of February 13, 1951, and German Patent 891,330, McGregor et al., of September 28, 1953; U.S. priority dated February 26, 1942).

Securing action of siloxanes

The polysiloxanes of this invention have startling and unusual adhesive properties. When subjected to slow and steady loads the soft and sticky polysiloxane mass (which exhibits a pronounced degree of flow even when cold) does not exhibit high adhesive or securing powers, and the polysiloxanes mass permits the threaded members it bonds to be relatively displaced, as for example, when a screw is being turned by a screw driver. However, when subjected to sudden shock, impact or vibrations, the high adhesive and securing powers of the polysiloxane does come into play and the permanent deformation of the mass is the less the harder the shock or impact sustained and the shorter its duration. The polysiloxane therefore exhibits an impact elasticity which varies with the shock intensity and its frequency. An adhesive bond, for instance between screws and nuts, is not adversely affected, loosened, or destroyed, when subjected to stresses of such a kind.

When the two cooperating parts are screwed together, they are not permanently cemented together, that is to say they can be readily unscrewed and screwed together again. Nevertheless, the joint has the surprising property of not working loose or undoing as a result of impact, shock, or vibrations even when subjected to powerful dynamic stresses. Adhesion takes effect immediately, and the bond automatically becomes stronger when the parts have been jointed.

Other materials

It has been found that in certain circumstances other resins and plastic materials may be added to the said siloxanes either as a diluent therefor or in order to usefully supplement the properties of said siloxane. For example, between about 5 and 90 percent by weight of polyvinyl chloride or polyvinyl esters may be added to said siloxanes prior to their placement between the threaded parts. The polysiloxanes may also be dyed with colored or white pigments if desired and may also be mixed with suitable fillers such as titanium dioxide, silicon dioxide and the like.

Whereas this invention has been described with reference to certain specific materials, those skilled in the art will readily appreciate that the essence of the invention has been set forth and that with this basic disclosure a number of non-inventive modifications and changes would suggest themselves to one skilled in the art. It is intended that all such equivalent modifications and changes be encompassed within this invention.

What is claimed is:

1. A novel method of securing cooperating threaded connections against relative movement under conditions of shock and sudden vibration which comprises placing a small amount of a polysiloxane on at least one of said threaded connections prior to engaging said threaded connections, said polysiloxane being a shock-elastic, kneadable, highly viscous, high molecular weight dimethyl polysiloxane having the properties of slow flow under mild pressure and resiliency when dropped.

2. A novel article comprising two threaded mechanical portions engaged together in a threaded interlocking relationship and a film of shock-elastic, kneadable, highly viscous, high molecular weight dimethyl polysiloxane having the properties of slow flow under mild pressure and resiliency when dropped disposed on at least one of the surfaces of said threaded mechanical portions.

References Cited in the file of this patent

UNITED STATES PATENTS

| | | |
|---|---|---|
| 2,321,414 | Parker | June 8, 1943 |
| 2,397,568 | Seaman | Apr. 2, 1946 |
| 2,635,929 | Brophy et al. | Apr. 21, 1953 |
| 2,939,805 | Johnson | June 7, 1960 |
| 2,968,840 | Morse | Jan. 24, 1961 |

OTHER REFERENCES

"Silicones and Their Uses," McGregor (McGraw-Hill Book Co. Inc., N.Y.) (1954).